United States Patent [19]

Swank

[11] Patent Number: 5,055,934
[45] Date of Patent: Oct. 8, 1991

[54] IMPLOSION PROTECTION MEANS HAVING MOUNTING LUG BASE-ACCOMMODATING CONCAVITIES THEREIN

[75] Inventor: Harry R. Swank, Lancaster, Pa.

[73] Assignee: Thomson Consumer Electronics, Inc., Indianapolis, Ind.

[21] Appl. No.: 533,650

[22] Filed: Jun. 5, 1990

[51] Int. Cl.$^5$ ............................................. H04N 5/65
[52] U.S. Cl. .................................................... 358/246
[58] Field of Search .................... 358/245–248, 358/209; 313/402, 406, 461, 476–477

[56] References Cited

U.S. PATENT DOCUMENTS

| | | | |
|---|---|---|---|
| 3,317,172 | 5/1967 | Balint | 248/316 |
| 3,697,686 | 10/1972 | Hildebrants | 358/246 |
| 4,004,092 | 1/1977 | Rogers | 358/246 |
| 4,037,255 | 7/1977 | Hill | 358/246 |
| 4,135,211 | 1/1979 | Rogers | 358/246 |
| 4,169,274 | 9/1979 | Larson et al. | 358/246 |
| 4,170,027 | 10/1979 | Amstutz et al. | 358/246 |
| 4,206,534 | 6/1980 | Amstutz et al. | 358/246 |
| 4,210,935 | 7/1980 | Mitchell et al. | 358/246 |
| 4,222,075 | 9/1980 | Mitchell et al. | 358/246 |
| 4,295,574 | 10/1981 | Nakazima et al. | 220/2.1 A |
| 4,323,813 | 4/1982 | Vieland et al. | 313/476 |
| 4,356,515 | 10/1982 | Sumiyoshi et al. | 358/246 |
| 4,360,837 | 11/1982 | Kreidler et al. | 358/246 |
| 4,415,932 | 11/1983 | Rogers | 358/246 |
| 4,459,735 | 7/1984 | Sawdon | 29/509 |
| 4,547,695 | 10/1985 | Rath | 313/406 |
| 4,547,696 | 10/1985 | Strauss | 313/477 R |
| 4,686,415 | 8/1987 | Strauss | 313/402 |
| 4,701,666 | 10/1987 | Palac | 313/477 R |
| 4,757,609 | 7/1988 | Sawdon | 29/798 |
| 4,789,805 | 12/1988 | Baselmans et al. | 313/402 |
| 4,849,671 | 7/1989 | Fendley | 313/402 |
| 4,900,976 | 2/1990 | Livshultz et al. | 313/402 |
| 4,930,015 | 5/1990 | Dougherty et al. | 358/247 |
| 4,990,825 | 2/1991 | Tsuki et al. | 358/245 |

Primary Examiner—Stephen Brinich
Attorney, Agent, or Firm—Joseph S. Tripoli; Dennis H. Irlbeck; Vincent J. Coughlin, Jr.

[57] ABSTRACT

An implosion-resistant cathode-ray tube has an evacuated envelope with a faceplate which includes a substantially rectangularly-shaped viewing portion that extends to a peripheral sidewall. The sidewall has corners with a given radius of curvature which extends into flattened portions. An implosion protection band extends around the sidewall. A plurality of mounting lugs each having a base portion and an upstanding attachment portion cooperate with the implosion protection band. The base portion of each of the mounting lugs is disposed between the band and the sidewall. The present implosion protection band is improved over prior bands by forming a plurality of concavities in the band to accommodate the base portions of the mounting lugs. The concavities prevent lateral displacement of the mounting lugs and also maximize the contact between the implosion protection means and the sidewall of the faceplate panel.

23 Claims, 6 Drawing Sheets

IMPLOSION PROTECTION MEANS HAVING MOUNTING LUG BASE-ACCOMMODATING CONCAVITIES THEREIN

This invention relates generally to implosion protection bands for cathode-ray tubes (CRTs) and more particularly, to implosion protection bands of either the shrinkfit type or the rimband type having concavities formed therein to accommodate the base portions of separately attached mounting lugs which support the tubes in the receivers.

BACKGROUND

A cathode-ray tube is evacuated to a very low internal pressure and accordingly is subject to the possibility of implosion due to the stresses produced by atmospheric pressure acting on all surfaces of the tube. This problem has been addressed in the art by providing the CRT with an implosion protection band. Such a band is used to apply a compressive force to the sidewall of the CRT to redistribute some of the faceplate forces. The redistribution of the faceplate forces decreases the probability of an implosion of the tube by minimizing tension in the corners of the faceplate. An implosion protection band is also beneficial because it improves the impact resistance of the tube. Glass in compression is stronger than glass which is in tension and the band causes compression in faceplate areas which otherwise would be in tension. Additionally, in the event of an implosion the redistributed stresses cause the imploding glass to be directed toward the back of the cabinet in which the tube is mounted, thereby substantially reducing the probability of someone in the vicinity of the imploding tube being injured.

Mounting lugs, either integral with, attached to, or disposed between the band and the tube faceplate are used to support the tube within the cabinet. Typically, the mounting lugs are positioned at the corners of the tube and aligned along the faceplate diagonals, although other placements of the mounting lugs are known in the art. U.S. Pat. No. 4,295,574, issued to Nakazima et al. on Oct. 20, 1981 discloses a shrinkfit band having integral mounting lugs. A drawback of such a unitized structure is that the lugs must be capable of being bent to properly position them relative to the tube. If the bend radius is too small, the lugs might break. Also if all the lugs are not bent correctly, it might be impossible to accurately mount the tube within the cabinet. Since the lugs must be capable of being bent, the mechanical strength of integral lugs also is suspect.

U.S. Pat. No. 4,222,075, issued to Mitchell et al. on Sept. 9, 1980, discloses a metal implosion protection band which encircles and exerts a compressive force on the sidewall of the faceplate panel. At least one "L"-shaped bracket member, or mounting lug, having a base portion connected to an upstanding attachment portion, with the base portion positioned intermediate the metal band and the corner of the faceplate panel, is used to support the tube within the cabinet. The width of the base portion of the mounting lug is made sufficiently narrow so that the implosion protection band contacts the sidewall of the faceplate panel on the radius of curvature of the corner rather than the flattened portions of the sidewall to enhance the implosion-resistant capabilities of the structures. One shortcoming of such a contact is that the base portion of the mounting lug is merely pinched between the band and the corner of the sidewall and care must be taken to properly locate the center line of the base portion of the lug along the diagonal of the faceplate. If the base portion of the mounting lug is improperly aligned, the attachment portion of the mounting lug will be offset relative to the corresponding attachment point in the cabinet. Additionally, if the base portion of the mounting lug is improperly positioned relative to the faceplate diagonal, the compressive forces on that corner of the faceplate will be unequal.

U.S. Pat. No. 4,210,935 issued to Mitchell et al. on July 1, 1980, discloses an "L"-shaped bracket, or mounting lug, used in conjunction with a rimband-type implosion resistant cathode-ray tube. In the patented structure, an adhesive is applied to the sidewall of the tube adjacent to the faceplate. A pair of metal rimbands overlie the adhesive and encircle the sidewall. The "L"-shaped mounting lugs each have a rounded base portion which is affixed to the rimband by a tension band which encircles and compresses the base portion of the mounting lug and contacts the rimband on the radius of curvature of the corner prior to the flattened portion of the sidewall. The latter-described structure has the same shortcomings described with respect to U.S. Pat. No. 4,222,075.

U.S. Pat. No. 4,360,837, issued to Kreidler et al. on Nov. 23, 1982, discloses a rimband implosion protection structure in which discretely formed slots in the rimband components engage compatibly with base portions of the mounting lugs to laterally position the mounting lugs prior to tightening the overlying tension band. One drawback of the disclosed structure is that the lug-affixing operation is labor intensive since the contoured base portions of the mounting lugs must be forced through the rimband slots and properly seated before the bands are attached to the tube. Forcing the base portions of the lugs through the slots in the rimbands also present the opportunity to damage or distort the corners of the rimband, thus, adversely affecting the compressive effect of the rimband on the underlying sidewall.

U.S. Pat. No. 3,317,172, issued to Balint on May 2, 1967, shows, in one embodiment, the base of a mount lug riveted or spot welded to an overlying tension band. The patent also shows the mounting lugs positioned adjacent to the flattened portion of the faceplate sidewall adjacent to the corner of the faceplate. A drawback of this structure is that the inward force on the portion of the tension band overlying the flat sidewall is proportional to the sine of the angle and that for small angles the inward force is very small. For example, if the angle of the sidewall is the degree (sine 0.017) and the force on the band is 3000 lb., the inward force is only 51 lb. Since a tension band is relatively thin and flexible, the weight of a large tube may be sufficient to offset the force of the band and cause the band to lose contact with the sidewall thereby jeopardizing the integrity of the implosion band.

SUMMARY OF THE INVENTION

An implosion-resistant cathode-ray tube has an evacuated envelope with a faceplate panel which includes a substantially rectangularly-shaped viewing portion that extends to a peripheral sidewall. The sidewall has corners with a given radius of curvature which extend into flattened portions. Implosion protection means extend around the sidewall. At least one mounting lug having a base portion and an attachment portion cooperates with the implosion protection means. The base portion of the mounting lug is disposed between the implosion protection means and the sidewall. The present implosion protection means is improved over prior means by at least one concavity being provided in the implosion protection means to accommodate the base portion of the mounting lug. The concavity prevents lateral displacement of the mounting lug and also maximizes the contact between the implosion protection means and the sidewall of the faceplate panel.

DETAILED DESCRIPTION OF THE PREFERRED EMBODIMENT

FIGS. 1-4 show an implosion-resistant cathode-ray tube 10 having an implosion protection shrinkfit band 12. The tube 10 comprises an evacuated envelope 14 including a funnel 15 with a faceplate panel 16 sealed thereto. The panel 16 includes a substantially rectangularly-shaped viewing portion 18 extending to a peripheral sidewall 20. The sidewall 20 has four corners 22 extending into flattened portions 24. Each of the corners 22 has an outside radius of curvature, $r_1$, which is substantially equal to the inside radius of curvature, $r_2$, of a conforming portion of the shrinkfit band 12 along the arc defined by the angle $\alpha$ (see FIG. 4).

The faceplate panel 16 is produced by molding glass in a two part mold (not shown). Accordingly, the sidewall 20 of the faceplate panel has a convex seam 26, commonly called the mold match line, which is formed where the two parts of the mold meet. Additionally, the sidewall of the faceplate panel is thicker where it joins the viewing portion 18 than it is at the open end which mates with the funnel 15. The angled sidewall improves the molding process and eases extraction of the molded glass panel from the mold. For this reason glass forward of the mold match line 26 is offset and lies at a small angle, $\beta$, with respect to the portion of the sidewall which joins the faceplate. This angle typically is in the order of 5.5°, for example.

The shrinkfit band 12 typically is manufactured by forming a strip of steel into a substantially rectangular loop with rounded corners and joining the two ends of the strip on one side of the band. The long sides of the band are designated A and the short sides B. For present standard tube sizes the long side—short side ratio is 4:3; however, the invention is not limited thereto and may, for example, be utilized on tubes having a long side—short side ratio of 16:9. The periphery of the loop is slightly smaller than the periphery of the faceplate panel 16. The band 12 is heated to approximately 300° to 500° C. and the band expands to dimensions permitting the loop to be slipped around the sidewall 20 and aligned with the mold match line 26 of the faceplate panel 16. As the band cools it shrinks and tightly surrounds the faceplate panel thereby applying the necessary implosion protection compression to the sidewall. The compressive force can be accurately controlled by controlling the yield point and thickness of the band. The corners of the band 12 seat against the corners 22 of the sidewall 20 first during cooling because they are the first contact points. The rest of the band 12 then settles against the flattened portions 24 of the sidewall 20. As the band cools, almost all forces are directed through the band into the blend areas where the straight sidewall blends into the curved corners of the faceplate panel 16. The forces are thus transferred to the panel corners 22 and into the faceplate panel 16 in a ratio proportional to the sine of the angle of the band with respect to the corners of the panel, times the tension of the band. Because the corners of the band 12 are in contact with the corners 22 of sidewall 20, there is substantially no movement of the band and the long sides of the band can initially adjust themselves and balance forces. A substantial portion of the strain is thus concentrated in the corner blend areas and these forces exceed the yield point of the band metal, thereby placing a controlled compressive force on the corners of the shrinkfit band 12 and through the band onto the corners 22 of the faceplate panel 16. These compressive forces offset tension forces which are produced on the faceplate corners by atmospheric pressure when the tube 10 is evacuated.

Figure 1:
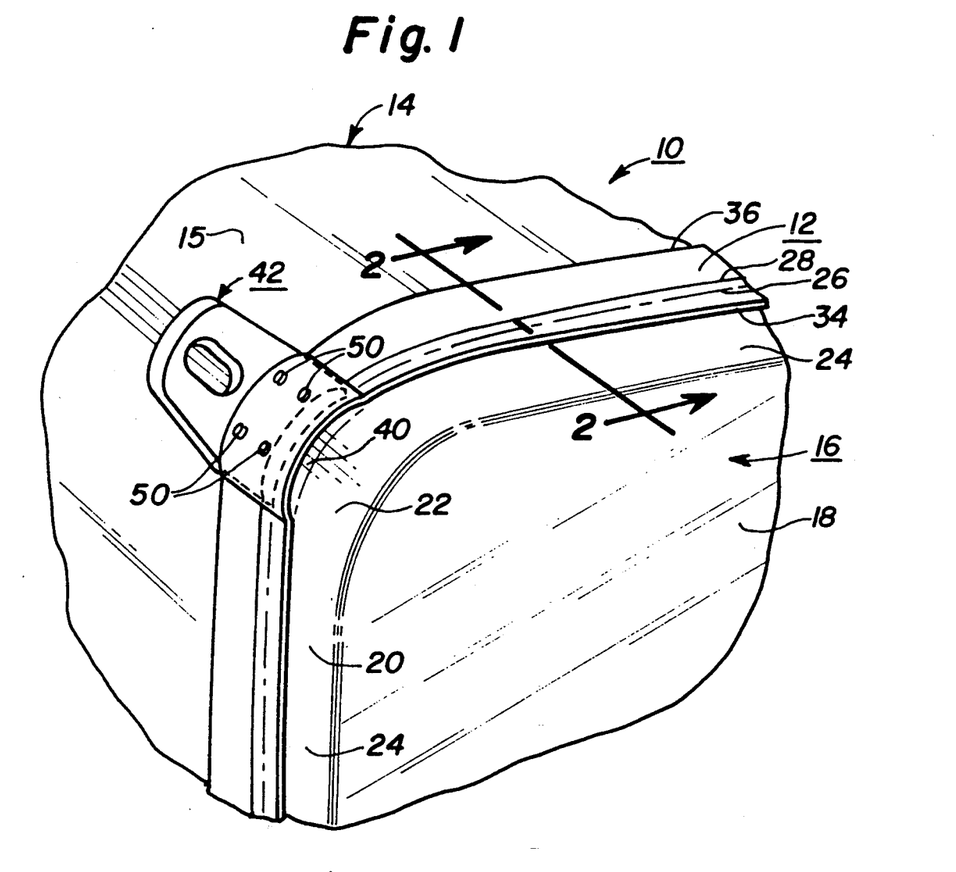
FIG. 1 is a partial perspective view of a forward portion of a CRT showing one embodiment of an implosion protection band having concavities formed in the corners of the band for accommodating the base of a mounting lug.
Figure 2:
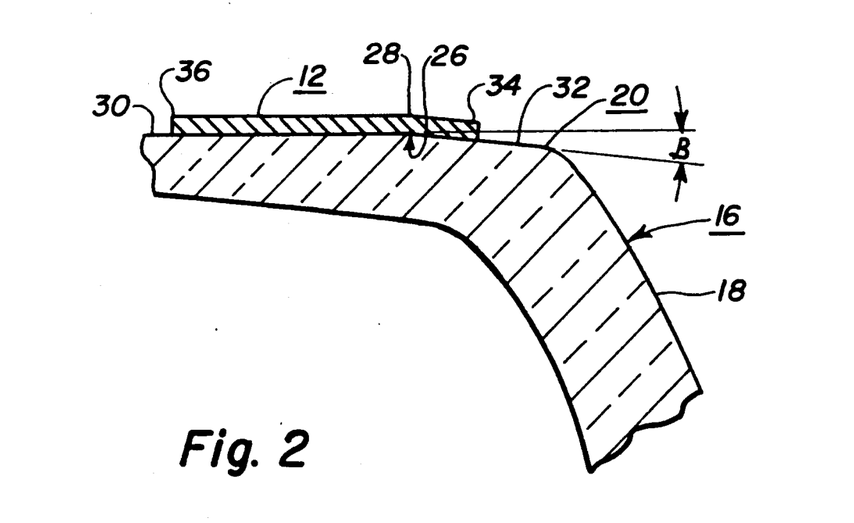
FIG. 2 is a cross section view taken along line 2—2 of FIG. 1.
Figure 3:
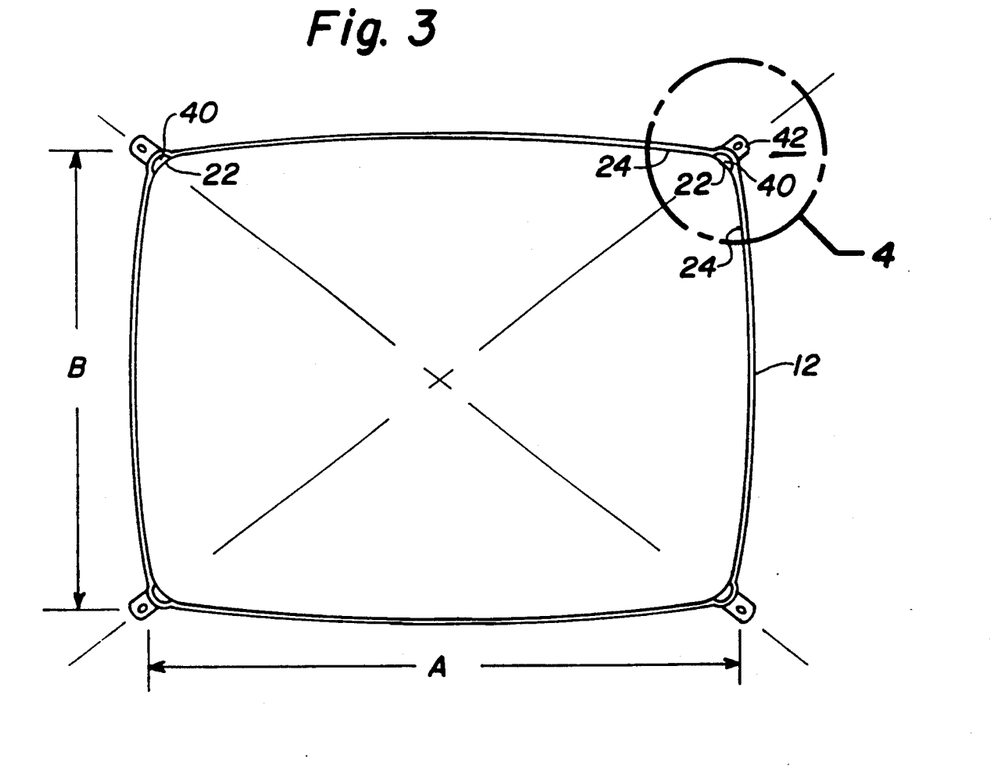
FIG. 3 is a front elevation view illustrating the viewing portion of the CRT faceplate and the implosion protection band shown in FIG. 1.

FIG. 2 is a cross section of the shrinkfit band 12 and faceplate 16 taken along line 2—2 of FIG. 1. Before it is tensioned, the band 12 has a bend 28 which displaces one edge of the band at an angle of about 6° to 9° away from the plane of the band. The bend 28 extends completely around the band 12. The advantages of the bend 28 can be appreciated from FIG. 2, which is a broken away cross section of the faceplate to be protected. The process of manufacturing the panel 16 utilizes a two piece mold in which glass is molded to form the panel. Because the mold is a two piece mold, the mold match line 26 is formed around the complete periphery of the panel 16 at the point where the two pieces of the mold meet. Also, an outside surface 30 of the open portion where the panel 16 joins the funnel 15 is disposed at the angle $\beta$ with respect to the upper sidewall surface 32 which joins the viewing portion 18. The angle $\beta$ typically is 5.5° and is utilized because it eases the manufacturing process by making it easier to remove the molded faceplate panel from the mold. Since the bend angle of the band exceeds the angle $\beta$ by about 0.5° to 3.5° before being positioned on the sidewall, when the shrinkfit band 12 cools, both of the edges 34 and 36 contact the surfaces 32 and 30, respectively, of the faceplate panel 16. As the band continues to cool it shrinks to the shape of the sidewall 20 so that almost the entire surface of the band is tightly drawn against the sidewall with the bend area 28 aligned with and overlying the mold match line 26.

Figure 4:
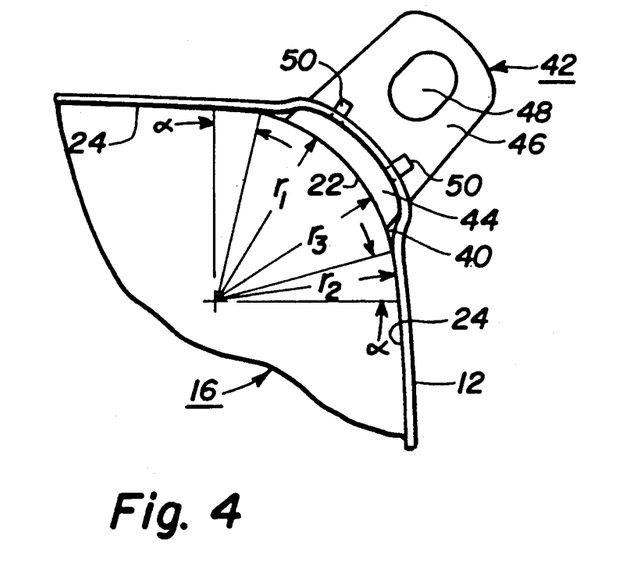
FIG. 4 is an enlarged view of the portion of the faceplate and implosion protection band shown within the circle 4 of FIG. 3.

The shrinkfit band 12, as described above, is identical to that described in copending U.S. patent application Ser. No. 443,202 filed on Nov. 30, 1989 by H. R. Swank and entitled, "Improved Shrink Fit Implosion Protection Band". The present shrinkfit band 12 differs from the prior band in that a plurality of concavities 40 are formed in the band. In the first embodiment, shown in FIGS. 1, 3 and 4, the concavities 40 overlie the corners 22 of the faceplate panel 16 and, preferably, but not necessarily, extend across the width of the shrinkfit band 12. A mounting lug 42 having a base portion 44 and an upstanding attachment portion 46 is associated with each of the concavities 40. The attachment portion 46 has an aperture 48 therethrough. As shown in FIG. 4, the base portion 44 of the mounting lug 42 is disposed within the concavity 40 to prevent lateral displacement of the lug. Typically the band 12 has a thickness of about 1.6 mm and the lug 42 has a thickness within the range of 2.0 to 3.2 mm and a strength which is sufficient to withstand or avoid distortion if the tube is dropped. The lugs are preferably made of quarter-hard cold rolled steel. The base portion 44 of the lug 42 has a radius of curvature, $r_3$, which conforms to, i.e., is substantially equal to, the radius of curvature, $r_1$, of the corner 22 of the faceplate panel 16. Preferably, the base portion 44 of the mounting lug 42 is attached, for example by mechanical crimping, riveting or welding, to the overlying shrinkfit band. The means of attachment is selected to provide a smooth contact surface with the glass sidewall of the faceplate panel. The preferred method of attachment is by means of at least one mechanical crimp 50 but preferably two spaced-apart rows of crimps with two or more crimps in each row are used to interlock the overlapping materials. Such a method is described in U.S. Pat. No. 4,459,735, issued to Sawdon on July 17, 1984. The lugs 42 are attached within the concavities 40 before the band is fitted onto the tube.

The shrinkfit band 12 compressively forces the base portion 44 of the mounting lug 42 against the corner 22 of the sidewall. The concavities 40 are formed to closely conform to the shape of the base portions 44 of the mounting lugs 42 so that the conforming portions of the shrinkfit band 12, having the radius of curvature, $r_2$, contacts the given radius of curvature $r_1$, of the corners of the sidewall immediately adjacent each of the concavities 40 to compressively force the band against at least a portion of each corner 22 along the arcs having an angle $\alpha$. This configuration of the band 12 and the mounting lugs 42 compressively contacts the corners 22 of the faceplate panel 16 along substantially the entire corner of the panel.

Figure 5:
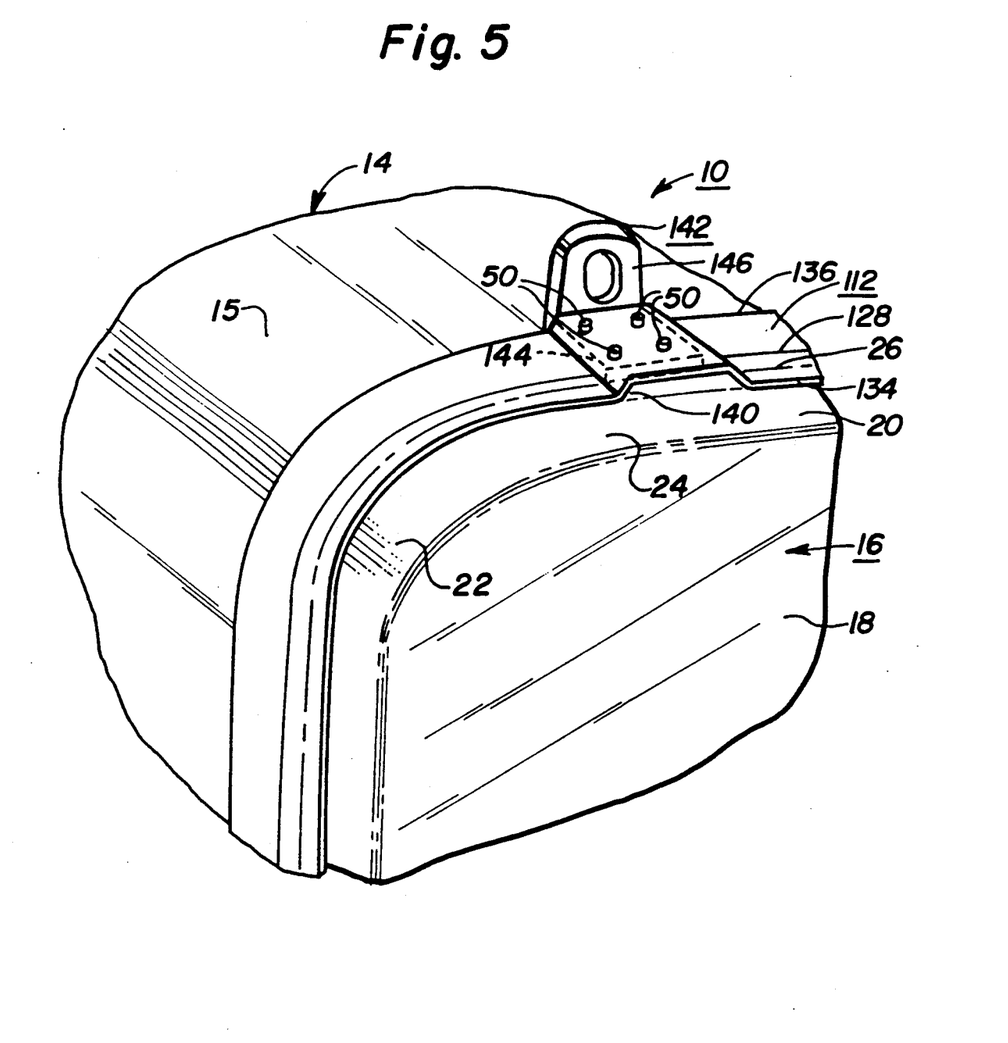
FIG. 5 is a partial perspective view of the forward portion of the CRT showing a second embodiment of an implosion protection band having concavities formed in the portion of the band overlying the flattened sidewall of the faceplate panel.
Figure 6:
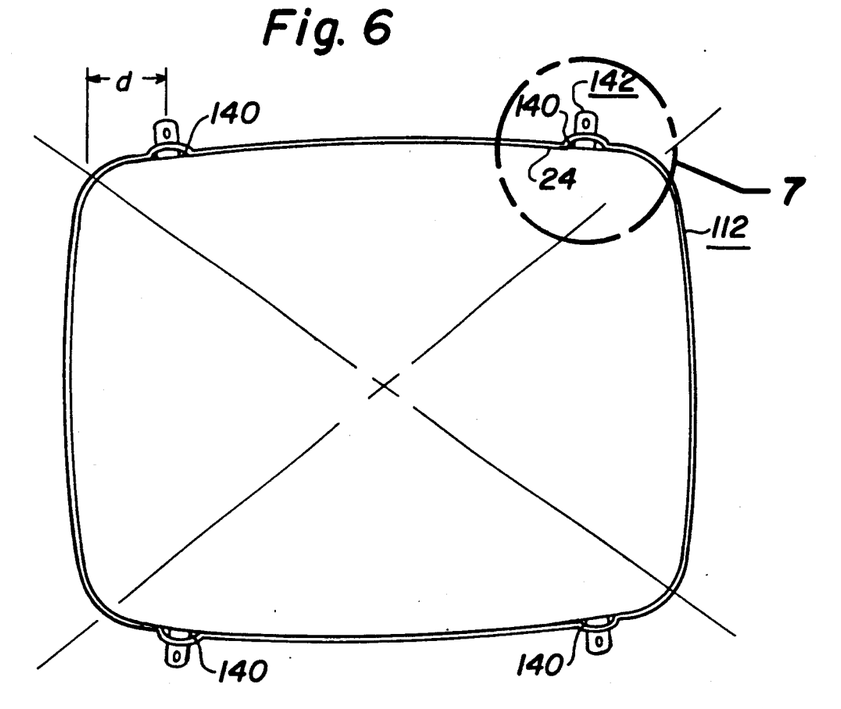
FIG. 6 is a front elevation view illustrating the viewing portion of the CRT faceplate and the implosion protection band shown in FIG. 5.
Figure 7:
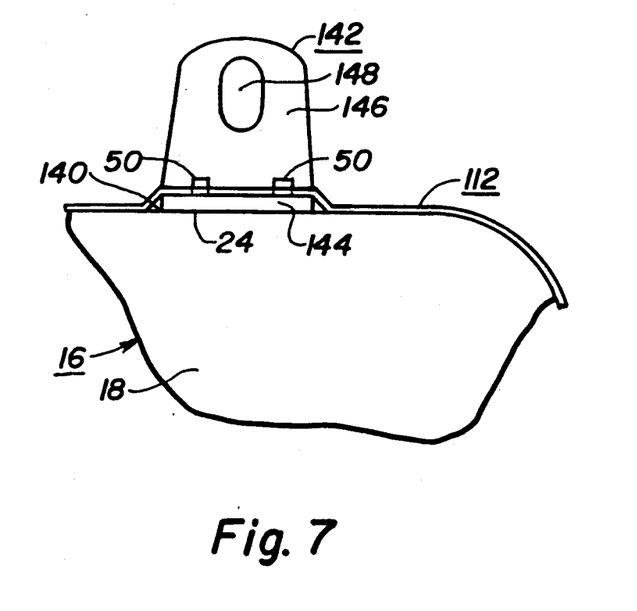
FIG. 7 is an enlarged view of the portion of the faceplate and implosion protection band shown within the circle 7 of FIG. 6.

A second embodiment of an implosion protection shrinkfit band 112 is shown in FIGS. 5-7. The shrinkfit band 112 is similar to the shrinkfit band 12 in all aspects, except that a plurality of concavities 140 are formed in the portions of the shrinkfit band that overlie the flattened portions 24 of the sidewall 20 of the faceplate panel 16 rather than in the corners. As shown in FIG. 6, two concavities 140 are formed in each of the oppositely disposed long sides of the band 112. Preferably, the concavities will be centered a distance, d, of about 2.5 to 7.6 cm from the corners of the band. The mounting lugs 142 are similar to the lugs 42 and include a base portion 144 with an upstanding attachment portion 146 having an aperture 148 therethrough to facilitate attachment to the receiver cabinet (not shown). The base portion 144 of the mounting lug 142 is disposed within the concavity 140 which prevents lateral displacement of the lug 142. The base portion 144 is attached to the overlying band 112 by means of mechanical crimping, riveting or welding. Preferably, the base portion 144 of the mounting lug 142 is secured to the band 112 by means of at least one mechanical crimp 50, although two spaced-apart rows of crimps with two or more crimps in each row are used to interlock the overlapping materials. The base portion 144 of the lug 142 is substantially flat where it contacts the flatter portions 24 of the sidewall 20. As described above, when the shrinkfit band 112 is disposed around the sidewall and begins to cool, the corners of the band seat first and then the rest of the band settles against the flattened portions 24 of the sidewall 20. The concavities 140 are formed to closely conform to the shape of the base portions 144. The bend 128 (FIG. 5) formed in the band 112 also ensures that the edges 134 and 136 of the band contact the surface of the sidewall 20 immediately adjacent each of the concavities to compressively force the base portions 144 of the mounting lugs 142 and the band 112 against the flattened portions of the sidewall.

Figure 8:
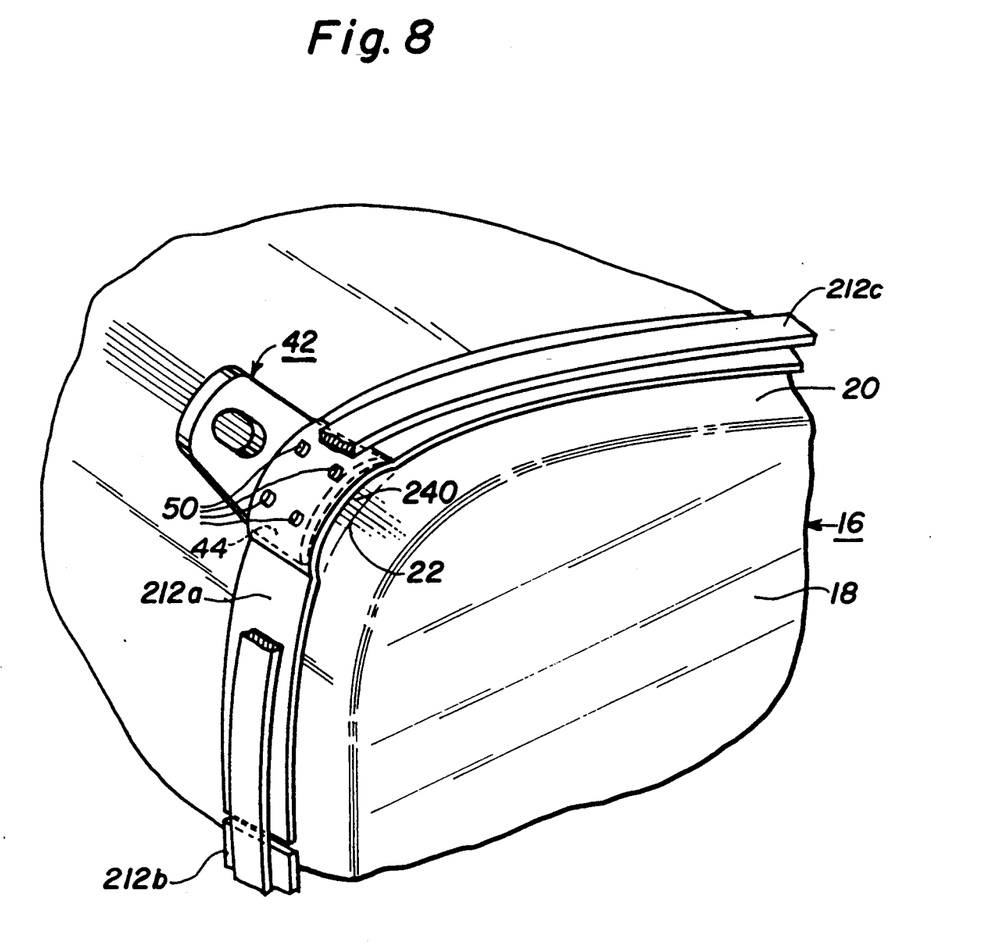
FIG. 8 is a partial perspective view of the forward portion of the CRT showing a third embodiment of an implosion protection band having concavities formed in the corners of the band for accommodating the base of a mounting lug.

A third embodiment of an implosion protection means is shown in FIG. 8. An adhesive (not shown) is provided around the sidewall 20 of the faceplate panel 16. The adhesive may comprise double-sided tape or any suitable adhesive known in the art. A pair of half-shell rimbands 212a and 212b are oppositely positioned on the sidewall 20 to contiguously surround the viewing portion 18 of the faceplate panel 16. The rimbands are secured to the sidewall by at least one tension band 212c, as is known in the art. The present rimbands 212a and 212b differs from prior rimbands, such as those described in U.S. Pat. No. 4,210,935, referenced above, in that the present rimbands 212a and 212b each have concavities 240 (only one is shown in FIG. 8) formed therein which overlie the corners 22 of the sidewall 20. The concavities 240 preferably, but not necessarily, extend across the width of the rimbands. One of the mounting lugs 42, described in detail with respect to the first embodiment of the invention, is associated with each of the concavities 240. The base 44 of each of the lugs 42 is disposed within a different one of the concavities 240 and laterally constrained thereby. The base 44 of the lug is mechanically secured to the overlying rimband by at least one mechanical crimp 50 but preferably two spaced-apart rows of crimps with two or more crimps in each row are used. The rimbands are then secured to the sidewall 20 by the conventional tension band 212c which encircles the rimbands, between the rows of crimps 50, and compressively forces the base portion 44 of each mounting lug 42 against the corners 22 of the sidewall 20. The compressive force transferred to the faceplate is limited in this embodiment by the amount of tension that can be applied to the tension band 212c.

Figure 9:
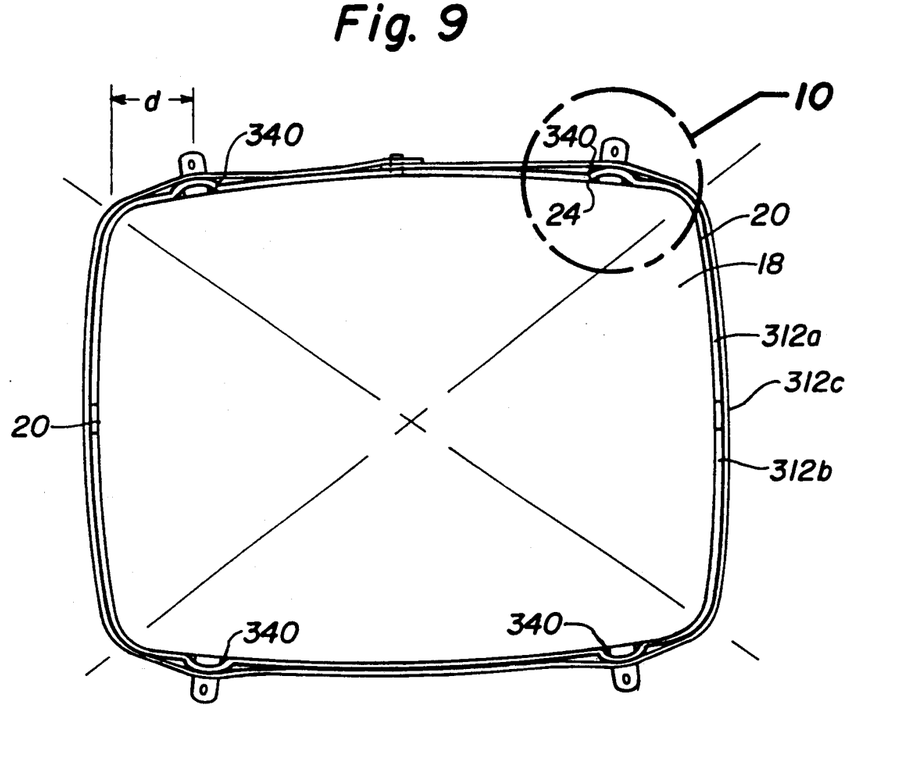
FIG. 9 is a front elevation view illustrating the viewing portion of the CRT faceplate and a fourth embodiment of an implosion band.
Figure 10:
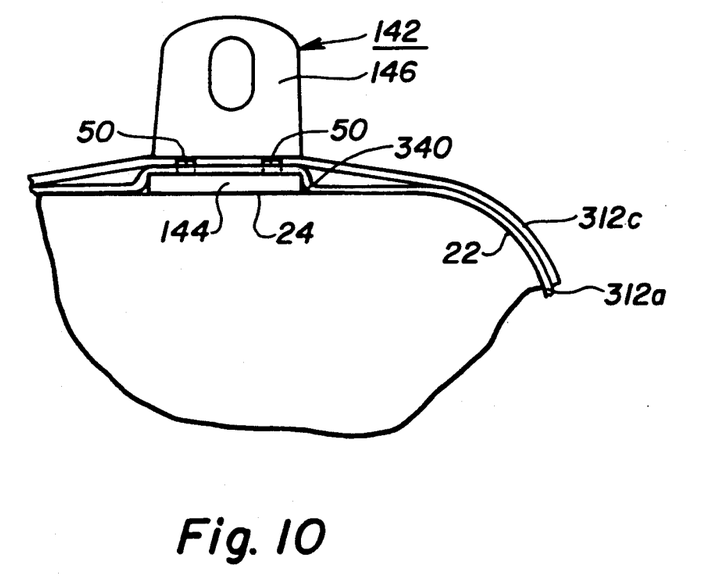
FIG. 10 is an enlarged view of the portion of the faceplate and implosion protection band shown within circle 10 of FIG. 9.

A fourth embodiment of the present invention is shown in FIGS. 9 and 10. A pair of half-shell rimbands 312a and 312b having a pair of concavities 340 formed in the oppositely disposed long sides thereof are oppositely positioned on the sidewall 20 to contiguously surround the viewing portion 18 of the faceplate panel 16. An adhesive, described above, is provided around the sidewall 20, under the rimbands 312a and 312b. The rimbands are secured to the sidewall by at least one tension band 312c, as is known in the art. The rimbands 312a and 312b each have two concavities 340 formed therein, the centers of which are located a distance, d, of about 2.5 to 7.6 cm from the corners of the bands. In this embodiment, the mounting lugs 142 having the substantially flat base portions 144 and upstanding attachment portions 146 are disposed within and laterally constrained by the concavities 340. Preferably, two spaced-apart rows of mechanical crimps 50 are used to attach the base portions 144 to the overlying rimbands 312a and 312b. The tension band 312c which encircles the rimbands is disposed between the rows of crimps 50 and tightened to compressively force the rimbands against the corners 22 of the sidewall and to draw the flat base portions 144 firmly against the flattened portions 24 of the sidewall.

What is claimed is:

1. In an implosion-resistant cathode-ray tube having an evacuated envelope with a faceplate panel, said faceplate panel including a substantially rectangularly-shaped viewing portion extending to a peripheral sidewall, said sidewall having corners with a given radius of curvature extending into flattened portions, implosion protection means extending around said sidewall, at least one mounting lug having a base portion and an attachment portion cooperating with said implosion protection means, the base portion of said mounting lug being disposed between said implosion protection means and said sidewall, the improvement comprising at least one concavity formed in said implosion protection means to accommodate said base portion to prevent lateral displacement thereof and to maximize the contact between said implosion protection means and said sidewall of said faceplate panel.

2. The implosion-resistant cathode-ray tube described in claim 1 wherein said implosion protection means comprises a shrinkfit band.

3. The implosion-resistant cathode-ray tube described in claim 2 wherein a plurality of concavities are formed in said band and overlie the corners of said sidewall.

4. The implosion-resistant cathode-ray tube described in claim 3 wherein said concavities extend across the width of said shrinkfit band.

5. The implosion-resistant cathode-ray tube described in claim 3 wherein a plurality of mounting lugs cooperate with said shrinkfit band, said base portion of each of said mounting lugs has an inner surface with a radius of curvature which conforms to the given radius of curvature of the corners of said sidewall, said shrinkfit band compressively forces said base portion against the corners of said sidewall.

6. The implosion-resistant cathode-ray tube described in claim 5, wherein said shrinkfit band contacts said given radius of curvature of the corners of said sidewall immediately adjacent each of said concavities to compressively force said band against at least a portion of each of the corners.

7. The implosion-resistant cathode-ray tube described in claim 6 wherein said base portion of each of said mounting lugs is attached to said shrinkfit band.

8. The implosion-resistant cathode-ray tube described in claim 3 wherein said concavities in said shrinkfit band are formed in the portions of said shrinkfit band overlying the flattened portions of said sidewall of said faceplate panel.

9. The implosion-resistant cathode-ray tube described in claim 8 wherein two concavities are formed in each of the oppositely disposed long sides of said shrinkfit band.

10. The implosion-resistant cathode-ray tube described in claim 9 wherein said base portion of each of said mounting lugs has a substantially flat inner surface in contact with the flat sidewall of said faceplate panel, said shrinkfit band contacts said sidewall immediately adjacent each of said concavities to compressively force said base portion of said mounting lugs and said shrinkfit band against the flattened portions of said sidewall.

11. The implosion-resistant cathode-ray tube described in claim 10 wherein said base portion of each of said mounting lugs is attached to said shrinkfit band.

12. The implosion-resistant cathode-ray tube described in claim 1 wherein said implosion protection means comprises a pair of rimbands oppositely positioned on said sidewall to contiguously surround said viewing portion of said faceplate panel, said rimbands are secured to said sidewall by at least one tension band which encircles said rimbands.

13. The implosion-resistant cathode-ray tube described in claim 12 wherein a plurality of concavities are formed in said rimbands and overlie the corners of said sidewall.

14. The implosion-resistant cathode-ray tube described in claim 13 wherein a plurality of mounting lugs cooperate with said rimbands, said base portion of each of said mounting lugs has an inner surface with a radius of curvature which conforms to the given radius of curvature of the corners of said sidewall, said tension band encircles said rimbands and compressively forces said base portion of each of said mounting lugs against the corners of said sidewall.

15. The implosion-resistant cathode-ray tube described in claim 14 wherein said base portion of each of said mounting lugs is attached to said rimbands.

16. The implosion-resistant cathode-ray tube described in claim 12 wherein said concavities in said rimbands are formed in the portions of said rimbands overlying the flattened portions of said sidewall of said faceplate panel.

17. The implosion-resistant cathode-ray tube described in claim 16 wherein two concavities are formed in each of the oppositely disposed long sides of said rimbands.

18. The implosion-resistant cathode-ray tube described in claim 17 wherein said base portion of each of said mounting lugs is attached to said rimbands.

19. In an implosion-resistant cathode-ray tube having an evacuated envelope with a faceplate panel, said faceplate panel including a substantially rectangularly-shaped viewing portion extending to a peripheral sidewall having a convex mold match line, said sidewall of said faceplate panel having four corners each with a given radius of curvature extending into flattened portions, a shrinkfit implosion protection band extending around said sidewall of said faceplate panel, said shrinkfit band having a front edge and a rear edge in contact with said sidewall in front of and behind said mold match line, respectively, at least four mounting lugs cooperating with said shrinkfit band, each lug having a base portion and an upstanding attachment portion, said base portion of each of said mounting lugs being disposed between said shrinkfit band and said sidewall of said faceplate panel, the improvement comprising at least four concavities formed in said shrinkfit band to accommodate said base portion of each of said mounting lugs to prevent lateral displacement thereof and to maximize the contact between said shrinkfit band and said sidewall of said faceplate panel.

20. The implosion-resistant cathode-ray tube described in claim 19 wherein said concavities formed in said shrinkfit band overlie the corners of said faceplate and the edges of said shrinkfit band contact said given radius of curvature of the corners of said sidewall immediately adjacent each of said concavities to compressively force said band against the base portions of said mounting lugs and against the corners of said sidewall of said faceplate panel.

21. The implosion-resistant cathode-ray tube described in claim 20 wherein said base portion of each of said mounting lugs is attached to said shrinkfit band.

22. The implosion-resistant cathode-ray tube described in claim 19 wherein said concavities formed in said shrinkfit band overlie the flattened portions of said sidewall, said concavities are formed in each of the oppositely disposed long sides of the shrinkfit band.

23. The implosion-resistant cathode-ray tube described in claim 22 wherein said base portion of each of said mounting lugs is attached to said shrinkfit band.

* * * * *